United States Patent [19]
Kirigaya

[11] Patent Number: 5,223,874
[45] Date of Patent: Jun. 29, 1993

[54] PENTAGONAL MIRROR UNIT OF SINGLE LENS REFLEX CAMERA

[75] Inventor: Tadayuki Kirigaya, Tokyo, Japan

[73] Assignee: Asahi Kogaku Kogyo Kabushiki Kaisha, Tokyo, Japan

[21] Appl. No.: 790,236

[22] Filed: Nov. 8, 1991

[30] Foreign Application Priority Data

Nov. 9, 1990 [JP] Japan ............................ 2-118159[U]

[51] Int. Cl.⁵ .......................................... G03B 13/08
[52] U.S. Cl. .................................. 354/225; 354/288
[58] Field of Search ........................... 354/219-225, 354/288

[56] References Cited

U.S. PATENT DOCUMENTS 4,926,208  5/1990  Teramoto et al. ................. 354/225

FOREIGN PATENT DOCUMENTS 164637  4/1989  Japan .
167627  5/1989  Japan .
167628  5/1989  Japan .
1142521 6/1989  Japan .

*Primary Examiner*—David M. Gray
*Attorney, Agent, or Firm*—Kane, Dalsimer, Sullivan, Kurucz, Eisele and Richard

[57] ABSTRACT

A pentagonal mirror unit of a single lens reflex camera including a hollow pentagonal mirror, a mirror sheet which is secured to a camera body and which has a recess in which the pentagonal mirror is fitted, a plurality of positioning projections which project downwardly from the lower end of the hollow pentagonal mirror, and a plurality of positioning holes provided on the bottom of the mirror sheet recess, so that the positioning projections can be fitted in the corresponding positioning holes.

5 Claims, 4 Drawing Sheets

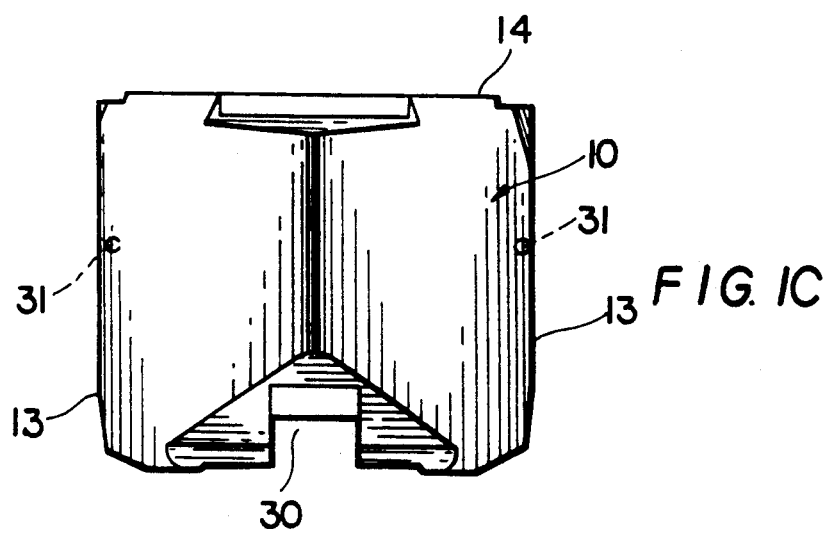
FIG. IC
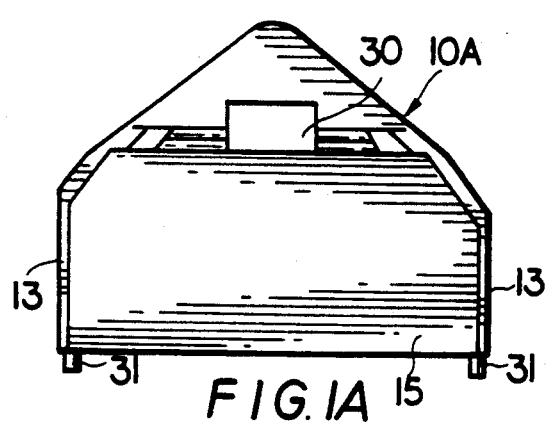
FIG. IA
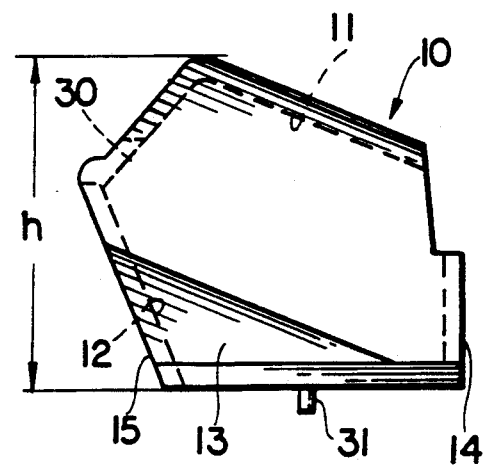
FIG. IB
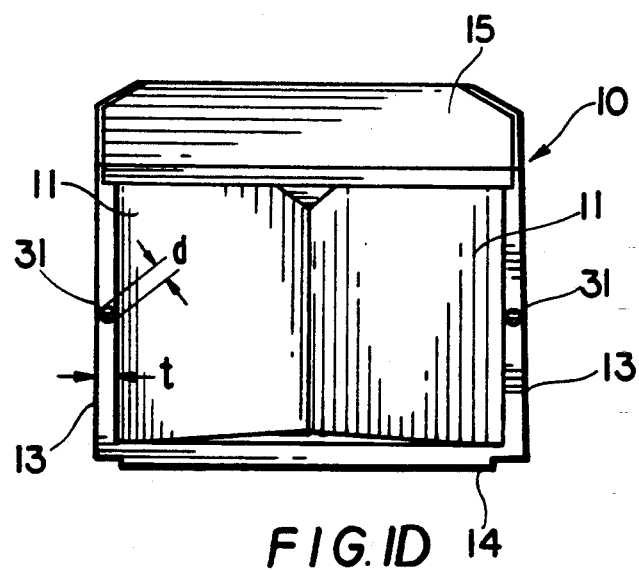
FIG. ID

PENTAGONAL MIRROR UNIT OF SINGLE LENS REFLEX CAMERA

BACKGROUND OF THE INVENTION

1. Field of the Invention

The present invention relates to a pentagonal mirror unit of a single lens reflex camera.

2. Description of Related Art

In a known finder of a single lens reflex camera, an object image (light) transmitted through a taking lens and reflected by a quick return mirror (first mirror) is focused on a focusing plate and is then reflected by upper roof surfaces of a pentagonal prism (pentagonal roof prism) and a third reflecting surface (front surface) thereof. The object image (light) is then made incident upon a magnifying lens (eyepiece) to obtain an erect image.

However, the finder using the pentagonal prism has drawbacks in that the pentagonal prism is expensive and heavy. To eliminate the drawbacks, it is known to use a hollow pentagonal mirror having reflecting mirrors corresponding to the roof surfaces and the third reflecting surface, in place of the conventional solid pentagonal prism. The hollow pentagonal mirror is lighter and less expensive than the solid pentagonal prism, since the glass body portion of the solid pentagonal prism is replaced with a cavity.

The hollow pentagonal mirror is usually secured to the camera body through a mirror sheet. In a conventional apparatus, the hollow pentagonal mirror is provided with an elastically deformable leg having an engaging pawl outwardly projecting at the free end of the elastically deformable leg. The mirror sheet can be provided with an engaging hole in which the engaging pawl of the elastically deformable leg is engaged to secure the hollow pentagonal mirror to the mirror sheet. Upon securing the pentagonal mirror to the mirror sheet, the elastically deformable leg of the pentagonal mirror is elastically deformed to be inserted in the mirror sheet to engage the engaging pawl in the corresponding engaging hole.

However, in the conventional apparatus, the elastic deformation of the elastically deformable leg causes the side surface of the pentagonal mirror and the roof surfaces thereof to deform which results in an adverse influence on the optical efficiency of the assembled pentagonal mirror. Furthermore, since the elastically deformable leg and the engaging pawl extend downwardly from the lower end of the pentagonal mirror, the injection molding dies, which are used to make the pentagonal mirror, are complicated and expensive.

SUMMARY OF THE INVENTION

The primary object of the present invention is to provide a simple and inexpensive pentagonal mirror unit which can be easily assembled and in which the hollow pentagonal mirror can be secured to a mirror sheet without deforming the hollow pentagonal mirror.

To achieve the object mentioned above, according to the present invention, there is provided a pentagonal mirror unit of a single lens reflex camera including a hollow pentagonal mirror and a mirror sheet which is secured to a camera body and which has a recess in which the pentagonal mirror is fitted, comprising a plurality of positioning projections which project downwardly from the lower end of the hollow pentagonal mirror, and a plurality of positioning holes provided on the bottom of the recess of the mirror sheet so that the positioning projections can be fitted in the corresponding positioning holes.

With this arrangement, since there is no engaging pawl projecting outwardly from the opposite sides of the hollow pentagonal mirror, the pentagonal mirror can be inserted in the recess of the mirror sheet upon assembly without deforming the pentagonal mirror. Consequently the roof surfaces are not deformed.

It is possible to provide the positioning projections and the positioning holes on the mirror sheet and the pentagonal mirror, respectively, instead of on the pentagonal mirror and the mirror sheet to achieve the same technical advantages.

According to another aspect of the present invention, there is provided a pentagonal mirror unit comprising a hollow pentagonal mirror having left and right side walls, a front inclined wall, and a pair of upper roof reflecting surfaces on the left and right side walls, and a third reflecting surface provided on the inner surface of the front inclined wall, a mirror sheet having a recess in which the lower portion of the hollow pentagonal mirror is fitted, a plurality of positioning projections provided on one of either the hollow pentagonal mirror or the mirror sheet to project toward the other, and a plurality of positioning holes provided on either the opposing mirror sheet or the hollow pentagonal mirror, so that the positioning projections can be fitted into the corresponding positioning holes.

According to still another aspect of the present invention, a pentagonal mirror unit comprises a hollow pentagonal mirror having left and right side walls, a front inclined wall, and a pair of upper roof reflecting surfaces on the left and right side walls, and a third reflecting surface provided on the inner surface of the front inclined wall, the lower ends of the left and right side walls and the inclined wall being flush with each other, a mirror sheet supporting the hollow pentagonal mirror and having a supporting flange corresponding to a plane in which the lower ends of the left and right side walls and the inclined wall lie flush with each other, a plurality of positioning projections provided on the left and right side walls of the hollow pentagonal mirror within the thickness thereof, and a plurality of positioning holes provided on the supporting flange of the mirror sheet so that the positioning projections can be fitted in the corresponding positioning holes.

The present disclosure relates to subject matter contained in Japanese utility model application No. 2-118159 (filed on Nov. 9, 1990) which is expressly incorporated herein by reference in its entirety.

BRIEF DESCRIPTION OF THE DRAWINGS

The invention will be described below in detail with reference to the accompanying drawings, in which:

FIG. 1A is a front elevational view of a hollow pentagonal mirror unit of a single lens reflex camera according to the present invention;

FIG. 1B is a right side elevational view of FIG. 1A;

FIG. 1C is a plan view of FIG. 1A;

FIG. 1D is a bottom view of FIG. 1A;

DESCRIPTION OF THE PREFERRED EMBODIMENTS

Figure 5:
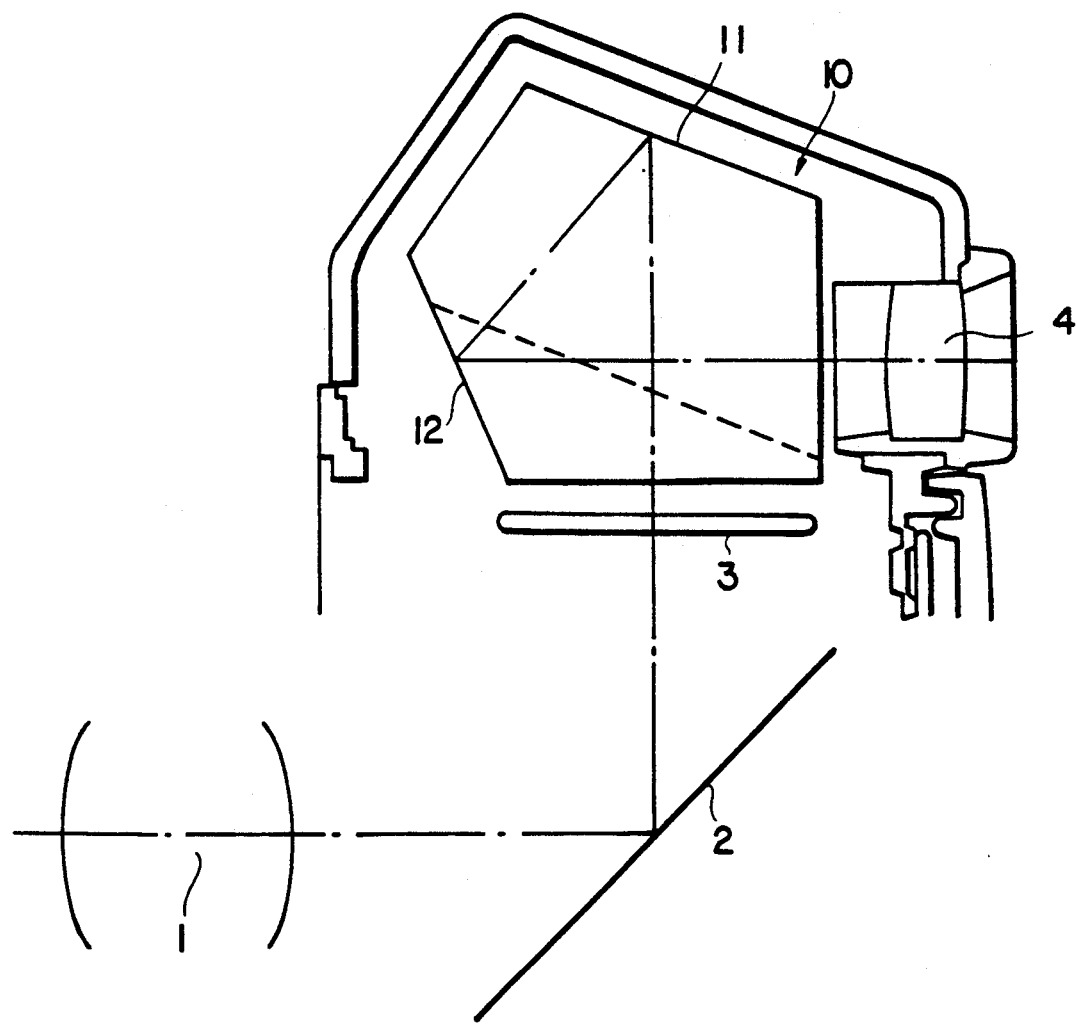

In a finder of a single lens reflex camera, as shown in FIG. 5, an object image transmitted through a taking or photographing lens 1 and reflected by a quick return mirror (first mirror) 2 is focused on a focusing plate 3. The focused object image is then reflected by the upper roof surfaces 11 of a hollow pentagonal mirror 10 (corresponding to the conventional pentagonal prism) and a third reflecting surface 12 provided on a front surface of the hollow pentagonal mirror 10, and is thereafter made incident upon a magnifying lens (eyepiece) 4 to form an erect image.

The main feature of the present invention is directed to the connecting mechanism between the hollow pentagonal mirror 10 and the mirror sheet 20 which supports the hollow pentagonal mirror 10.

As mentioned above, the hollow pentagonal mirror 10 has the upper roof surfaces 11 and the third reflecting surface 12. The hollow pentagonal mirror 10 is made of vertical left and right side surfaces (plates) 13, a vertical rear surface (plate) 14, and a front inclined surface (plate) 15. The third reflecting surface 12 is formed on the inner side of the front inclined surface 15. The front inclined surface 15 (the third reflecting surface 12) is usually made separate from a mirror body having the upper roof surfaces 11, the left and right surfaces 13 and the vertical rear surface 14, and then adhered to the mirror body to form the hollow pentagonal mirror.

The lower end faces of the side surfaces 13, the rear surface 14, and the inclined surface 15 are flush with each other. The side surfaces 13 are provided on their lower ends with cylindrical positioning projections 31 located at the intermediate portions thereof. The positioning projections 31 project downwardly from the lower ends of the side surfaces 13. The diameter "d" of the positioning projections 31 is smaller than the thickness "t" of the side surfaces (plates) 13. The positioning projections 31 are located within the thickness "t" of the side surface (plates) 13.

The mirror sheet (mirror receptacle) 20 has a recess 21 which receives the lower end of the pentagonal mirror 10 and outwardly projecting flanges 22 which are provided on the upper end of the recess 21. The recess 21 is defined by inner right and left side wall surfaces 23, a rear wall surface 24, and a front inclined wall surface 25. The recess 21 is provided on its bottom with an inwardly projecting annular flange 26.

The inner flange 26 is provided, on the right and left portions thereof, with positioning holes 32a and 32b in which the corresponding positioning projections 31 are fitted. The hole 32a is a circular hole having a diameter substantially equal to the diameter of the cylindrical projections 31, and the hole 32b is an elongated hole extending in the left and right directions and having a width "s" substantially equal to the diameter of the cylindrical projections 31. The circular hole 32a and the corresponding positioning projection 31 fit together in a precise manner. Also, the positioning projection 31 and the corresponding elongated hole 32b are precisely fit in the direction of the width "s".

To assemble the pentagonal mirror unit as constructed above, the lower end of the hollow pentagonal mirror 10 is inserted in the recess 21 of the mirror sheet 20. Upon insertion, the right and left side surfaces 13 smoothly slide on and along the associated right and left side wall surfaces 23 of the mirror sheet 10 without bringing the projections 31 contacting with the side wall surfaces 23. Namely, the projections 31 of the pentagonal mirror 10 are located within the thickness of the side walls 13 thereof, as mentioned above, and accordingly, the projections 31 do not exert any force on the side walls 13 upon insertion and thus the side walls 13 do not deform.

When the lower ends of the right and left side walls 13 reach the annular flange 26 of the mirror sheet 20, the projections 31 are fitted into the corresponding holes 32a and 32b, respectively. The positional accuracy of the pentagonal mirror 10 in a direction (forward and rearward direction) perpendicular to a line connecting the holes 32a and 32b is determined by the fit (tolerance) between the projections 31 and the corresponding holes 32a and 32b. On the other hand, the positional accuracy of the pentagonal mirror 10 in the lateral direction is determined by the fit between the projection 31 and the corresponding circular hole 32a, since the other hole 32b is an elongated hole extending in the lateral direction. In other words, the elongated hole 32b restricts the position of the pentagonal mirror 10 in the forward and rearward direction, but does not restrict the position thereof in the lateral direction. This absorbs a possible dimensional error, contraction and expansion, of the right and left projections 31 in the lateral direction.

As can be understood from the foregoing, according to the present invention, no elastic deformation of the pentagonal mirror 10 occurs during assembly, and there is no adverse influence on the precision of the angle of the roof surfaces.

Figure 2:
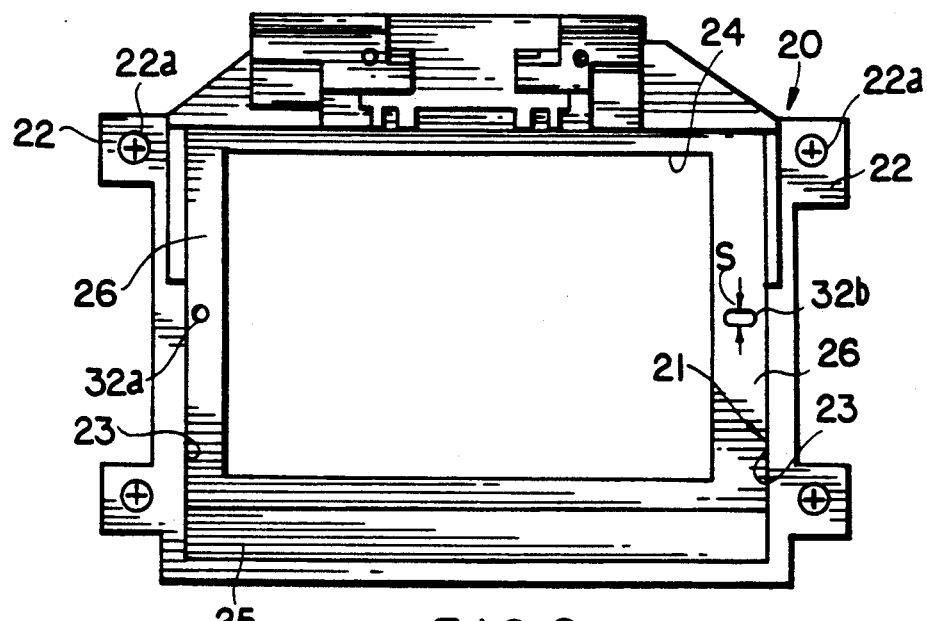
FIG. 2 is a plan view of a mirror sheet according to the present invention.
Figure 4:
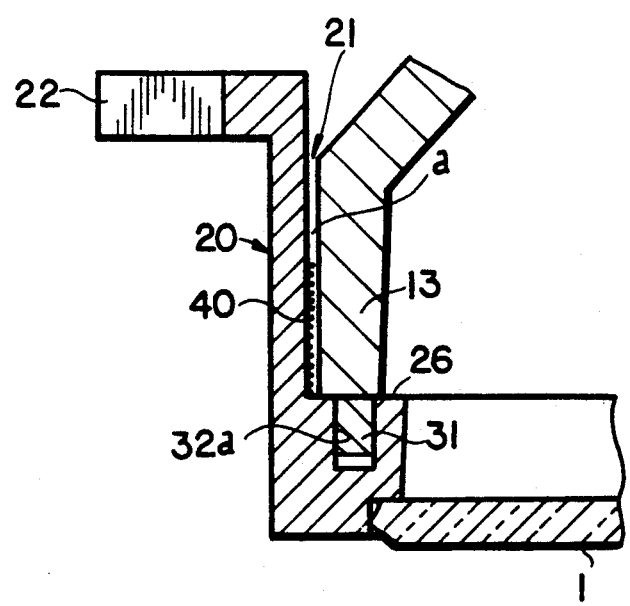
FIG. 4 is an enlarged sectional view of a connecting portion between a pentagonal mirror and a mirror sheet; and, FIG. 5 is a longitudinal sectional view of an optical path in a finder of a single lens reflex camera.

After the pentagonal mirror 10 is precisely mounted to the mirror sheet 20, both are adhered to each other for example by an adhesive 40 with which gaps "a" (FIG. 4) defined between the left and right surfaces 13 of the pentagonal mirror 10 and the recess 21 of the mirror sheet 20 are filled.

Although one of the holes 32a and 32b is a circular hole and the other is an elongated hole in the illustrated embodiment, both can be circular holes.

Figure 3:
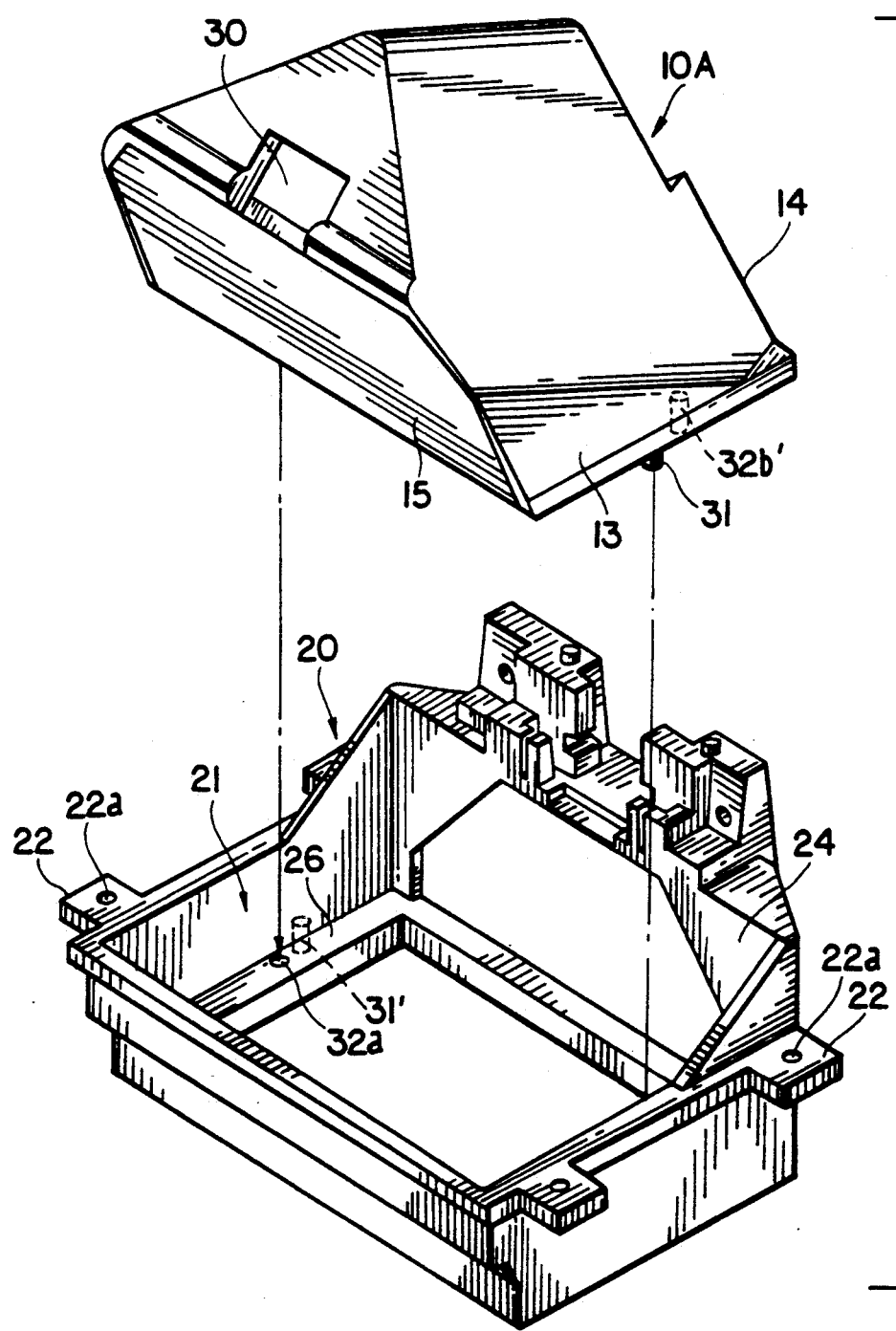
FIG. 3 is a perspective view of a pentagonal mirror which is inserted in a mirror sheet, according to the present invention.

It is also possible to provide the positioning projections 31' and the holes 32a', 32b' on the mirror sheet 20 and the pentagonal mirror 10, respectively, as shown in FIG. 3 by two-dotted line, instead of on the pentagonal mirror and the mirror sheet.

I claim:

1. A pentagonal mirror unit of a single lens reflex camera including a hollow pentagonal mirror and a mirror sheet secured to a camera body which has a recess in which said pentagonal mirror is fitted, comprising;

left and right positioning projections which project downwardly from the lower end of said hollow pentagonal mirror; and, left and right positioning holes on the bottom of said mirror sheet recess corresponding to said positioning projections on said hollow pentagonal mirror respectively, one of said left and right positioning holes being a circular hole and the other being a elongated hole so that said positioning projections can be fitted in said corresponding positioning holes.

2. A pentagonal mirror unit according to claim 1, wherein said left and right positioning projections are provided on lower ends of left and right side walls of said hollow pentagonal mirror.

3. A pentagonal mirror unit according to claim 2, wherein said left and right positioning projections are cylindrical and have a diameter smaller than the thickness of the side walls of said hollow pentagonal mirror.

4. A pentagonal mirror unit according to claim 3, wherein said left and right cylindrical positioning projections of said hollow pentagonal mirror are located within said thickness of said left and right side walls thereof.

5. A pentagonal mirror unit according to claim 4, wherein gaps are defined between said side walls of the hollow pentagonal mirror and said recess of the mirror sheet, said gaps being filled with an adhesive to secure said hollow pentagonal mirror and the mirror sheet.

* * * * *